Feb. 24, 1959 R. E. STILWELL 2,874,978
PIPE COUPLING HAVING A MANUALLY OPERATED LATCHING MEANS
Filed March 2, 1955
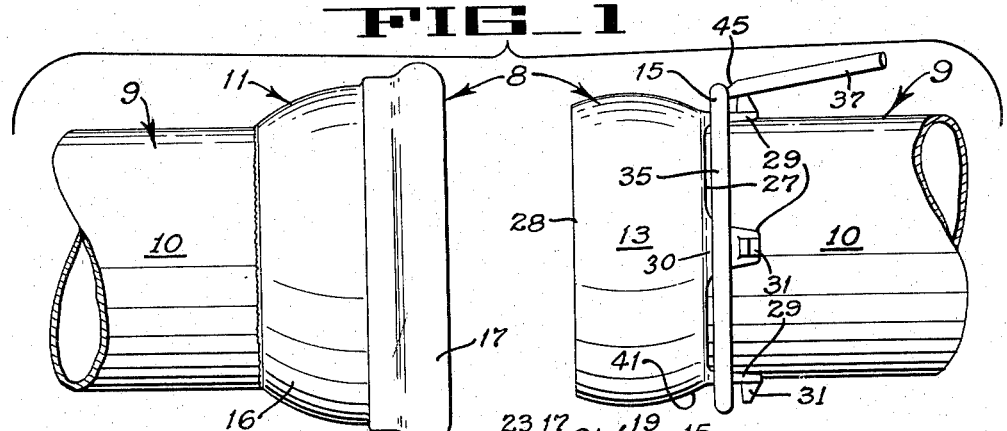
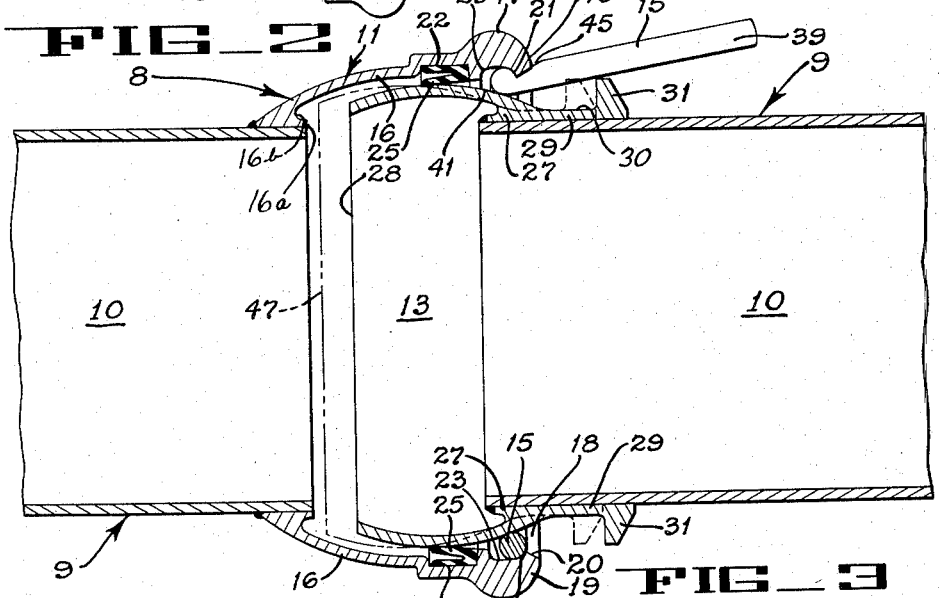
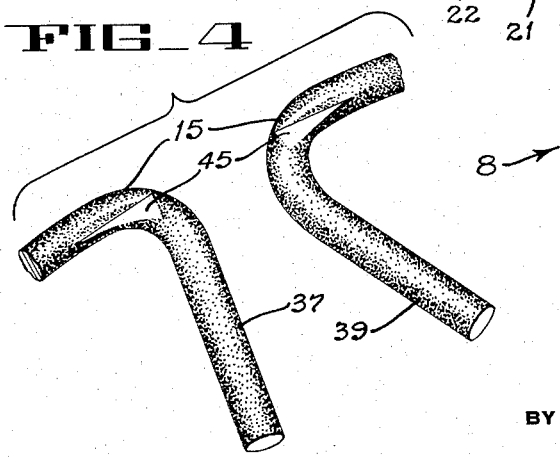
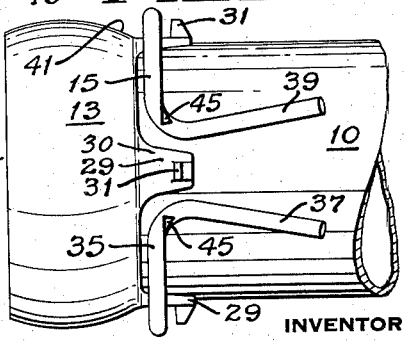
INVENTOR
ROBERT E. STILWELL
BY *Hans G. Hoffmeister*
ATTORNEY

2,874,978

PIPE COUPLING HAVING A MANUALLY OPERATED LATCHING MEANS

Robert E. Stilwell, Santa Clara, Calif., assignor to Food Machinery and Chemical Corporation, San Jose, Calif., a corporation of Delaware Application March 2, 1955, Serial No. 491,669

1 Claim. (Cl. 285—5)

This invention relates to pipe couplings for connecting the pipes of temporary water supply systems of the type used in crop irrigation and fire fighting, as emergency domestic water sources, and the like.

One object of the present invention is to provide an improved universal coupling for the pipes of temporary water supply systems.

Another object of the present invention is to provide a novel coupling for water supply systems of the above mentioned type which may be easily and quickly coupled and uncoupled.

These and other objects and advantages of the present invention will become apparent from the following description and accompanying drawings in which:

Fig. 1 is an elevation of the present coupling showing it uncoupled and attached to adjacent ends of pipes that are to be coupled together.

Fig. 2 is an enlarged longitudinal section of the coupling shown in Fig. 1, said coupling being shown in its coupled position.

Fig. 3 is a plan view of a portion of the coupling shown in Fig. 1.

Fig. 4 is a fragmentary, enlarged perspective view of one of the coupling parts shown in Fig. 3.

The pipe coupling 8 (Fig. 2) of the present invention is shown embodied in a water supply system 9 comprising a plurality of pipes 10, only two of which are shown. The pipe coupling 8 comprises a bell member 11 (Fig. 1), a spigot member 13, and a resilient catch or locking ring 15 adapted to hold the bell and spigot members 11 and 13, respectively, in coupled relation.

The bell member 11 (Fig. 2) comprises a hollow, spherical segment portion 16 adapted to have one of its ends, which is provided with a flange 16a sealingly secured by any convenient means, such as by welding, on an end of one of the irrigation pipes 10. An annular groove 16b, the purpose for which will become apparent later herein, joins the free end of the flange 16a with the inner wall surface of the spherical segment portion 16. The other end of the segment portion 16 is provided with an enlarged annular portion 17 having a circular opening 18 in its distal end, said opening being defined by an annular inturned flange 19, having an outwardly flaring surface 20 and a catch abutment surface 21 within the bell 11. The interior surface of the annular portion 17 is provided with spaced, inner and outer continuous grooves 22 and 23. The inner groove 22 is formed with steep sides and is adapted to sealingly receive a V-sectioned, annular rubber gasket 25 of conventional construction. The outer groove 23 is formed directly behind the inturned flange 19 and is adapted to receive the resilient catch or locking ring 15 upon insertion of the catch into the bell member when assembling the coupling 8.

The spigot member 13 (Fig. 3) is formed in the shape of a hollow, spherical segment that is slightly smaller than the bell member 11. Both ends 27 and 28 of the spigot member 13 are open, the end 27 being adapted to be sealingly secured by any convenient means, such as by welding, on an end of one of the irrigation pipes 10. The end 27 of the spigot member 13 also has a plurality of equally spaced fingers 29 extending longitudinally therefrom, said fingers having radially and outwardly protruding lugs 31 formed thereon.

The catch 15 is made from a circular cross sectioned rod of a resilient material, such as aluminum, that is formed into a uniplanar, generally annular, open loop 35 (Figs. 1 and 3) having end portions or handles 37 and 39 bent in the same general direction substantially normal to the plane of the loop 35. The handles 37 and 39 are spaced apart and are of such length that they can be easily grasped by hand and pulled toward or away from each other to slightly reduce or enlarge the diameter of the loop 35 of the catch 15. The loop 35 is so constructed and arranged that its normal inner diameter is slightly less than the largest diametral portion of the spigot member 13, and that its normal outer diameter is slightly greater than the diameter of the opening 18 (Fig. 2) in the bell member 11 and closely approximates the diameter of the groove 23 in the enlarged portion of the bell 11.

The catch 15 is adapted to be loosely mounted on the end 27 of the spigot member 13 about the longitudinally extending fingers 29 that form, in effect, a discontinuous ring-receiving neck 30. To thus mount the catch 15 its handles 37 and 39 are pulled apart thereby increasing the normal inner diameter of the loop 35 sufficiently to enable it to be slipped over the free end 28 of the spigot member 13 and to pass over the largest diametral portion of the spigot member. The handles 37 and 39 may then be released and the loop 35 will, due to the resilience of the material from which it is made, return to its normal size. The catch 15 will thereupon be retained on the end 27 of the spigot member 13 by the radial lugs 31 which due to their spaced arrangement allow the handles 37 and 39 to be moved downwardly between adjacent lugs and nearer to the axis of the spigot member 13 when the spigot member is inserted into the ball member, as indicated by the phantom line position 47 to reduce the diameter of the loop 35 during the insertion of the loop into or the removal thereof from the bell member 11. The catch is prevented from sliding over the spigot member because the largest diametral portion of the spigot member 13 is of greater diameter than the normal inner diameter of the catch loop 35 and forms an abutment surface 41 (Fig. 2) for the loop.

To assemble the coupling 8 and to thus couple the two pipes 10 to which the bell member 11 and spigot member 13 are secured, the spigot member 13 is fully inserted into the bell member 11 through the opening 18 until the free end 28 of the spigot member seats against the annular groove 16b or until the end 28 assumes a position close to that of the phantom line position 47, shown in Fig. 2. The handles 37 and 39 of the catch 15 are then manually urged toward each other to compress the catch loop 35 and reduce its outer diameter sufficiently to enable the loop 35 to be inserted into the bell member 11 through the space between the edge of the opening 18 and the neck 30 of the spigot member. After such insertion of the loop 15 the handles 37 and 39 are released, thereby permitting the loop to again assume its normal size, whereupon the loop 35 will seat itself firmly in the annular groove 23 directly behind the flange 19. As best shown in Fig. 4, the loop 35 is provided with recesses 45 at the points where the catch 15 turns to form the handles 37 and 39. The recesses 45 permit the portion of the loop 35 adjacent the handles to also seat firmly in the groove 23, as may be seen in Fig. 2. With the catch 15 in this position in the grove 23 it is locked in the bell 11, the abutment surface 21 of flange 19 preventing its longitudinal removal from the bell and the bottom of the groove 23 preventing its expansion.

Upon the introduction of water to the supply system 9 and the build-up of water pressure therein, the gasket 25 will become sealed to the bell and spigot members 11, 13, thus preventing the leakage of water therebetween, and the pipes 10 will move longitudinally away from each other until the spigot member 13 and the bell member 11 assume the relative positions shown in full lines in Fig. 2. Further relative movement of the bell member 11 and spigot member 13 will then be prevented by the contact of the abutment surface 41 of the spigot member 13 with the catch loop 35 which is locked in position in the bell 11, as previously described. In view of the generally spherical, opposite surfaces of the spigot member 13 and the bell member 11 and the curved surface of the catch loop 35 the spigot member 13 is free to move angularly within the bell member 11 and to assume, within limits, any angular position with respect to the axis of the bell member 11. Thus the water system 9 may be laid out over uneven and rolling ground, and may be curved around obstacles.

To disconnect the coupling 8 after the water pressure in the supply system 9 has been relieved, the catch handles 37 and 39 are pressed toward each other to compress the catch loop 35 until its outer diameter is small enough that the loop can be withdrawn from the bell member 11 through the opening 18. Such withdrawal of the loop 35 releases the spigot member 13 and permits its withdrawal from the bell member 11 through the opening 18. As previously mentioned, the catch 15 will be retained on the proximal end 27 of the spigot member 13 by the radial lugs 31 and the curved abutment surface 41 of the spigot member, so that it will be readily accessible when it is desired to again connect the bell and spigot members.

While a preferred embodiment of the present invention has been described, it will be understood that various changes and modifications may be made in the details thereof without departing from the spirit and scope of the appended claim.

Having thus described the invention what is claimed as new and desired to be protected by Letters Patent is:

A coupling for pipes adapted to carry fluid under pressure, comprising a hollow bell member having a pipe receiving opening in one end and a spigot receiving opening in the other end, the inner surface of said bell member having the form of a spherical segment, stop means disposed interiorly of said bell member about said pipe receiving opening, an inturned flange on said other end of the bell member around said spigot receiving opening and defining an inwardly opening locking groove, a spigot member having a portion in the form of a spherical segment insertable into said bell member, the inner end of said spigot member being substantially normal to the axis of said spigot member, an annular groove in said bell member spaced inwardly from said locking groove and having an annular resilient gasket therein for sealing the space between said bell and spigot members, a locking ring of resilient material comprising an open annular loop loosely encircling said spigot member, said open loop being contractable for insertion into the annular locking groove of said bell member through the annular opening remaining between said spigot member and the inturned flange of said bell member after insertion of the spigot member thereinto, radially projecting lugs on the outer end of said spigot member and disposed in circumferentially spaced relation thereabout, the annular locking groove of said bell member being spaced from said lugs a distance substantially equal to the axial dimension of the locking ring when said inner end of the spigot member is seated against said stop means of said bell member, said locking ring open loop terminating in a pair of angularly disposed loop contracting handles extending in a substantially axial direction from the ends of said loop, said handles extending between said lugs and beyond the adjacent end of said spigot member, said locking ring when in alignment with said locking groove being expandable by its own resiliency into said locking groove, and means on said locking ring at the juncture of said handles and said open loop for receiving said inturned flange of said bell member to insure seating of the expanded ring in said locking groove, said locking ring when expanded into said groove having an internal diameter less than the maximum diameter of said spherical segment portion of the spigot member to restrain the spigot member from movement outwardly of the bell member.

References Cited in the file of this patent

UNITED STATES PATENTS

| | | |
|---|---|---|
| 1,016,620 | Gapp | Feb. 6, 1912 |
| 1,328,399 | Reddy | Jan. 20, 1920 |
| 1,651,522 | Gold | Dec. 6, 1927 |
| 1,824,792 | Reure | Sept. 29, 1931 |
| 1,902,697 | Ellingsen | Mar. 21, 1933 |
| 2,440,452 | Smith | Apr. 27, 1948 |
| 2,556,659 | Patterson | June 12, 1951 |
| 2,565,572 | Pangborn | Aug. 28, 1951 |
| 2,638,362 | Sherman | May 12, 1953 |

FOREIGN PATENTS

| | | |
|---|---|---|
| 15,823 | Great Britain | Sept. 17, 1892 |
| 480,025 | Italy | Apr. 18, 1953 |
| 1,083,873 | France | June 30, 1954 |